(12) United States Patent
Gan et al.

(10) Patent No.: US 9,025,350 B2
(45) Date of Patent: May 5, 2015

(54) CASCADED H-BRIDGE MEDIUM VOLTAGE DRIVE, POWER CELL AND BYPASS MODULE THEREOF

(71) Applicant: Delta Electronics (Shanghai) Co., Ltd, Shanghai (CN)

(72) Inventors: Hongjian Gan, Shanghai (CN); Qinglong Zhong, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 379 days.

(21) Appl. No.: 13/628,961

(22) Filed: Sep. 27, 2012

(65) Prior Publication Data

US 2013/0121042 A1 May 16, 2013

(30) Foreign Application Priority Data

Nov. 11, 2011 (CN) .......................... 2011 1 0357786

(51) Int. Cl.
*H02H 7/122* (2006.01)
*H02M 1/32* (2007.01)
*H02M 7/49* (2007.01)

(52) U.S. Cl.
CPC ........ *H02M 1/32* (2013.01); *H02M 7/49* (2013.01); *H02M 2001/325* (2013.01)

(58) Field of Classification Search
CPC .... H02M 1/32; H02M 7/49; H02M 2001/325
USPC .............. 363/15–17, 34–37, 40–41, 50, 55, 363/56.01–56.12, 86, 131–133; 361/88, 90, 361/91.1, 91.2, 91.5, 91.7, 92, 93.1
See application file for complete search history.

(56) References Cited

U.S. PATENT DOCUMENTS 8,410,638 B2 * 4/2013 Johnson, Jr. .................. 307/105
2003/0214824 A1 * 11/2003 Corzine .......................... 363/71
(Continued)

FOREIGN PATENT DOCUMENTS

| CN | 1214567 A | 4/1999 |
|---|---|---|
| CN | 1244745 A | 2/2000 |

(Continued)

OTHER PUBLICATIONS

Jose Rodriguez, Bin Wu, Jorge O. Pontt; "Multilevel Voltage-Source-Converter Topologies for Industrial Medium-Voltage Drives"; Dec. 2007; IEEE Transactions on Industrial Electronics; vol. 54; pp. 2930-2945.*

(Continued)

*Primary Examiner* — Nguyen Tran
*Assistant Examiner* — Shahzeb K Ahmad
(74) *Attorney, Agent, or Firm* — Tim Tingkang Xia, Esq.; Morris, Manning & Martin, LLP

(57) ABSTRACT

The present application relates to a cascaded H-Bridge medium voltage drive, a power cell, and a bypass module thereof, wherein the bypass module is configured for bypassing a major circuit module of the power cell, while the major circuit module comprises a fuse, a rectifier, a bus capacitor and an H-Bridge inverter, two points led from the H-Bridge inverter being configured as a first output end and a second output end; a bypass circuit comprises a first bridge arm and a second bridge arm; a point led from the first bridge arm is configured as a first input end of the bypass circuit, a point led from the second bridge arm is configured as a second input end of the bypass circuit, and the first input end is electrically connected with the first output end, the second input end is electrically connected with the second output end.

28 Claims, 7 Drawing Sheets

(56) References Cited

U.S. PATENT DOCUMENTS

2005/0281065 A1* 12/2005 Nojima ........................... 363/98
2005/0286274 A1* 12/2005 Pfitzer et al. ..................... 363/37
2013/0100716 A1* 4/2013 Tong et al. ....................... 363/37

FOREIGN PATENT DOCUMENTS

| | | | |
|---|---|---|---|
| CN | 101073197 A | 11/2007 | |
| EP | 2369725 A1 | 9/2011 | |
| WO | 0031963 A1 | 6/2000 | |

OTHER PUBLICATIONS

"Office Action" issued by the State Intellectual Property Office of the People's Republic of China on Jul. 29, 2014.

"Search Report" issued by the State Intellectual Property Office of the People's Republic of China.

\* cited by examiner

CASCADED H-BRIDGE MEDIUM VOLTAGE DRIVE, POWER CELL AND BYPASS MODULE THEREOF

CROSS REFERENCE TO RELATED APPLICATIONS

The present application is based upon and claims priority under 35 U.S.C. §119(a) to prior Chinese Patent Application No. 201110357786.9 filed on Nov. 11, 2011, the entire contents of which are incorporated herein by reference.

FIELD OF THE INVENTION

The present application relates to the technical field of Variable-frequency Drive (VFD), and more particularly to a cascaded H-Bridge medium voltage drive, a power cell and a bypass module thereof.

BACKGROUND OF THE INVENTION

The use of high power variable-frequency drive has become increasingly popular with the rapid development of modern power electronic technology and microelectronic technology. In particular, under the circumstance that the operation reliability of medium-voltage/high-voltage devices is not high enough while the cost thereof is expensive, such a problem has been well resolved in recent years by means of cascading low-voltage power cells. Therefore, the application fields and range of cascaded H-Bridge medium voltage drive have become more and more broad, which enables an efficient and proper use of energy (especially the electric energy).

In cascaded H-Bridge medium voltage drive, the number of power cells varies with different voltage levels of the drive system. Taking a drive system of 6 kV as an example, there are generally 5 or 6 power cells connected in series for each phase, in which each power cell provides the same output voltage, and thus there are a total of 15 or 18 power cells. As to a drive system of 10 kV, the number of power cells even reaches as many as 27. With so many power cells, once a malfunction occurs in a certain power cell, the whole drive system may fail and be unable to keep operating if there isn't any proper solution, which may result in an economic loss or an aggravation of accident. Increasing of the number of power cells makes the drive system less reliable.

This problem can be resolved effectively by a bypass circuit of a power cell. A major circuit turns on when a power cell operates normally, that is, the whole drive system can operate normally as long as the major circuit operates normally. Therefore, the bypass circuit of the power cell in cascaded H-Bridge medium voltage drive is such a bypass device that makes a major circuit of the power cell bypassed (or shorted) when a failure occurs in the major circuit of the power cell, so as to prevent the whole drive system from shutting down. In related arts, there is one bypass circuit for each power cell in the cascaded H-Bridge medium voltage drive. When the major circuit of a certain power cell fails and thus is unable to output a voltage normally, in order to avoid the whole cascaded H-Bridge medium voltage drive from shutting down, the bypass circuit of failed power cell bypasses the corresponding main circuit, that is, the corresponding bypass circuit will be switched on for operation, thereby the major circuit of failed power cell is bypassed (shorted), thus the whole cascaded H-Bridge medium voltage drive is enabled to keep operating, which ensures that no economic or other kinds of loss occurs due to shutting down of the cascaded H-Bridge medium voltage drive.

Chinese Patent Application No. 201010218945.2 discloses a unit bypass circuit of unit cascaded H-Bridge medium voltage drive, which is inefficient since a mechanical-operated switch blade therein needs to be closed manually when the power cell malfunctions, and then the mechanical-operated switch blade needs to be opened after the malfunctioned power cell is replaced.

There is also disclosed another technical solution in related arts, in which a mechanical means of contactor is adopted as a bypass circuit as shown in FIG. 1. This bypass circuit, of which the close and open are controlled by an auxiliary switch KM, is of a high reliability and has its advantages in low power cascaded H-Bridge medium voltage drive system. However, it will be more complicated and relative expensive for the system design in high power variable-frequency drive due to a large size and a high cost of the contactor.

In summary, the bypass circuit in the cascaded H-Bridge medium voltage drive in related arts has disadvantages such as being expensive and large-sized, hence needs to be further improved.

SUMMARY OF THE INVENTION

An object of the present application is to provide a cascaded H-Bridge medium voltage drive, a power cell and a bypass module thereof, which effectively solve the problems such as high cost and large size of prior bypass circuit, and are simple in circuit structure, low in conductive loss and high in reliability.

In order to achieve the above object, the present application provides a bypass module of a power cell in a cascaded H-Bridge medium voltage drive, which is configured for bypassing a major circuit module of the power cell, wherein the major circuit module comprises a fuse, a rectifier, a bus capacitor and an H-Bridge inverter, two points led from the H-Bridge inverter respectively being configured as a first output end and a second output end of the major circuit module, the bypass module comprising a bypass circuit, wherein, the bypass circuit comprises a first bridge arm and a second bridge arm, the first bridge arm has at least one of a first switch element and a second switch element, the second bridge arm has at least one of a first diode and a second diode; a point led from the first bridge arm of the bypass circuit is configured as a first input end of the bypass circuit, a point led from the second bridge arm of the bypass circuit is configured as a second input end of the bypass circuit, and the first input end is electrically connected with the first output end of the major circuit module, the second input end is electrically connected with the second output end of the major circuit module; when the major circuit module malfunctions and the bypass circuit is switched on for operation, one of the first switch element and the second switch element and one of the first diode and the second diode of the bypass circuit turn on to bypass the major circuit module of corresponding power cell.

Preferably, the first switch element is a first IGBT (Insulated Gate Bipolar Transistor), the second switch element is a second IGBT.

Preferably, the bypass circuit comprises the first IGBT, the second IGBT, the first diode and the second diode; an emitter of the first IGBT is electrically connected with a collector of the second IGBT, an anode of the first diode is electrically connected with a cathode of the second diode, a collector of the first IGBT is electrically connected with a cathode of the first diode, and an emitter of the second IGBT is electrically connected with an anode of the second diode; a conducting wire led from a point between the first IGBT and the second IGBT is configured as the first input end of the bypass circuit; a conducting wire led from a point between the first diode and the second diode is configured as the second input end of the bypass circuit; a first branch is formed by the first diode and the first IGBT, and a second branch is formed by the second diode and the second IGBT; the first output end of the major circuit module is electrically connected to the first input end of the bypass circuit, and the second output end of the major circuit module is electrically connected to the second input end of the bypass circuit.

Preferably, when a current received at the first input end of the bypass circuit is negative, and a current received at the second input end thereof is positive, if the major circuit module of the power cell malfunctions and the bypass circuit is switched on for operation, the first diode and the first IGBT of the bypass circuit turn on to bypass the major circuit module of corresponding power cell, so as to enable the whole cascaded H-Bridge medium voltage drive to keep operating.

Preferably, when a current received at the first input end of the bypass circuit is positive, and a current received at the second input end thereof is negative, if the major circuit module of the power cell malfunctions and the bypass circuit is switched on for operation, the second diode and the second IGBT of the bypass circuit turn on to bypass the major circuit module of corresponding power cell, so as to enable the whole cascaded H-Bridge medium voltage drive to keep operating.

Preferably, the bypass circuit comprises the first IGBT, the second IGBT, the first diode and the second diode; a collector of the first IGBT is electrically connected with an emitter of the second IGBT, a cathode of the first diode is electrically connected with an anode of the second diode, an emitter of the first IGBT is electrically connected with an anode of the first diode, and a collector of the second IGBT is electrically connected with a cathode of the second diode; a conducting wire led from a point between the first IGBT and the second IGBT is configured as the first input end of the bypass circuit; a conducting wire led from a point between the first diode and the second diode is configured as the second input end of the bypass circuit; a first branch is formed by the first diode and the first IGBT, and a second branch is formed by the second diode and the second IGBT; the first output end of the major circuit module is electrically connected to the first input end of the bypass circuit, and the second output end of the major circuit module is electrically connected to the second input end of the bypass circuit.

Preferably, when a current received at the first input end of the bypass circuit is positive, and a current received at the second input end thereof is negative, if the major circuit module of the power cell malfunctions and the bypass circuit is switched on for operation, the first diode and the first IGBT of the bypass circuit turn on to bypass the major circuit module of corresponding power cell, so as to enable the whole cascaded H-Bridge medium voltage drive to keep operating.

Preferably, when a current received at the first input end of the bypass circuit is negative, and a current received at the second input end thereof is positive, if the major circuit module of the power cell malfunctions and the bypass circuit is switched on for operation, the second diode and the second IGBT of the bypass circuit turn on to bypass the major circuit module of corresponding power cell, so as to enable the whole cascaded H-Bridge medium voltage drive to keep operating.

Preferably, the bypass circuit comprises the first IGBT, the second IGBT, the first diode and the second diode; an emitter of the first IGBT is electrically connected with an anode of the first diode, an emitter of the second IGBT is electrically connected with an anode of the second diode, a collector of the first IGBT is electrically connected with a cathode of the second diode, and a collector of the second IGBT is electrically connected with a cathode of the first diode; a conducting wire led from a point between the first IGBT and the first diode is configured as the first input end of the bypass circuit; a conducting wire led from a point between the second IGBT and the second diode is configured as the second input end of the bypass circuit; a first branch is formed by the first diode and the second IGBT, and a second branch is formed by the second diode and the first IGBT; the first output end of the major circuit module is electrically connected to the first input end of the bypass circuit, and the second output end of the major circuit module is electrically connected to the second input end of the bypass circuit.

Preferably, when a current received at the first input end of the bypass circuit is positive, and a current received at the second input end thereof is negative, if the major circuit module of the power cell malfunctions and the bypass circuit is switched on for operation, the first diode and the second IGBT of the bypass circuit turn on to bypass the major circuit module of corresponding power cell, so as to enable the whole cascaded H-Bridge medium voltage drive to keep operating.

Preferably, when a current received at the first input end of the bypass circuit is negative, and a current received at the second input end thereof is positive, if the major circuit module of the power cell malfunctions and the bypass circuit is switched on for operation, the second diode and the first IGBT of the bypass circuit turn on to bypass the major circuit module of corresponding power cell, so as to enable the whole cascaded H-Bridge medium voltage drive to keep operating.

Preferably, the bypass circuit further comprises an absorption circuit, which includes an absorption capacitor connected in parallel across the bypass circuit.

Preferably, the absorption circuit further includes a third protection resistor; the absorption capacitor is connected in series with the third protection resistor, and then they are connected in parallel across the bypass circuit.

Preferably, the bypass module further comprises a first protection resistor and a second protection resistor; one end of the first protection resistor is electrically connected with one end of the absorption capacitor, another end of the first protection resistor is electrically connected with one end of the bus capacitor; one end of the second protection resistor is electrically connected with another end of the absorption capacitor, and another end of the second protection resistor is electrically connected with another end of the bus capacitor.

Preferably, the bypass circuit further comprises a RC branch and a bypass circuit status detecting unit; the RC branch consists of a fourth resistor and a storage capacitor, the fourth resistor is connected in series with the storage capacitor and then they are connected in parallel across the bypass circuit; the bypass circuit status detecting unit is connected in parallel with the RC branch and is configured for detecting whether the bypass circuit is on operation.

Preferably, the bypass module further comprises a bypass controlling circuit, which is electrically connected with the first switch element and the second switch element and is configured for controlling on or off state of the first switch element and the second switch element.

Preferably, the first switch element is a first IGBT, and the second switch element is a second IGBT, and gates of the first IGBT and the second IGBT are connected with the bypass controlling circuit.

The present application also provides a power cell of a cascaded H-Bridge medium voltage drive, which comprises a major circuit module, a power cell controlling module and a bypass module; wherein, the major circuit module comprises a fuse, a rectifier, a bus capacitor, and an H-Bridge inverter, two points led from the H-Bridge inverter being configured as two output ends of the major circuit module; the bypass module is any bypass module as described above; two input ends of the bypass module are coupled to two output ends of the major circuit module, respectively; the power cell controlling module is electrically connected with the major circuit module and the bypass module.

Preferably, the power cell controlling module comprises a control circuit and a fault detecting unit; the fault detecting unit is configured for detecting whether the major circuit module malfunctions; the control circuit is configured for transmitting a fault detecting signal when a malfunction is detected by the fault detecting unit.

Preferably, the fault detecting unit includes a phase lack detecting circuit and/or a bridge arm failure detecting circuit; the phase lack detecting circuit is electrically connected with three-phase inputs of an AC power supply via the fuse, and is configure for detecting whether the major circuit module malfunctions at an AC input end thereof; the bridge arm failure detecting circuit is electrically connected with the H-Bridge inverter, and is configured for detecting whether the H-Bridge inverter malfunctions.

The present application also provides a cascaded H-Bridge medium voltage drive, which comprises a phase shifting transformer, a power cell and a three-phase load, wherein, the power cell comprises a major circuit module, a bypass module and a power cell controlling module; the major circuit module comprises a fuse, a rectifier, a bus capacitor and an H-Bridge inverter, two points led from the H-Bridge inverter being configured as two output ends of the major circuit module; the bypass module is any bypass module as described above; two input ends of the bypass module are coupled to two output ends of the major circuit module, respectively; the power cell controlling module is electrically connected with the major circuit module and the bypass module.

Preferably, the phase shifting transformer comprises at least one secondary winding.

Preferably, three-phase outputs of each secondary winding in the phase shifting transformer are connected with three-phase input ends of the power cell, respectively.

Preferably, the power cell controlling module comprises a control circuit and a fault detecting unit; the fault detecting unit is configured for detecting whether the major circuit module malfunctions; the control circuit is configured for transmitting a fault detecting signal when a malfunction is detected by the fault detecting unit.

Preferably, the fault detecting unit includes a phase lack detecting circuit and/or a bridge arm failure detecting circuit; the phase lack detecting circuit is electrically connected with three-phase inputs of an AC power supply via the fuse, and is configured for detecting whether the major circuit module malfunctions at an AC input end thereof; the bridge arm failure detecting circuit is electrically connected with the H-Bridge inverter, and is configured for detecting whether the H-Bridge inverter malfunctions.

Preferably, the bypass module further comprises a bypass controlling circuit, which is electrically connected with the first switch element and the second switch element and is configured for controlling on or off state of the first switch element and the second switch element.

Preferably, the cascaded H-Bridge medium voltage drive further comprises a drive controlling system, wherein, when the fault detecting unit detects that the major circuit module of the power cell malfunctions, the control circuit generates the fault detecting signal and transmits it to the drive controlling system, then the drive controlling system transmits a control signal to the power cell controlling module, so as to trigger the bypass controlling circuit of the bypass module, whereby the bypass controlling circuit switches the bypass circuit on for operation to bypass the malfunctioned major circuit module.

Preferably, the cascaded H-Bridge medium voltage drive further comprises a drive controlling system, wherein, when the fault detecting unit detects that the major circuit module of the power cell malfunctions, the control circuit generates the fault detecting signal and transmits it to the drive controlling system, then the drive controlling system transmits a control signal to trigger the bypass controlling circuit of the bypass module, whereby the bypass controlling circuit switches the bypass circuit on for operation to bypass the malfunctioned major circuit module.

The cascaded H-Bridge medium voltage drive, the power cell and the bypass module thereof according to the present application have the following advantages: when the major circuit module malfunctions and the bypass circuit is switched on for operation, one of the first switch element and the second switch element and one of the first diode and the second diode in the bypass circuit turn on to bypass the major circuit module of corresponding power cell, so as to ensure a normal operation of the cascaded H-Bridge medium voltage drive with a low loss and a simple circuit structure, thereby to enable an excellent cost advantage for high power medium voltage drive systems.

DETAILED DESCRIPTION OF THE INVENTION

The objects, features and advantages will become more apparent through a further detailed description of the cascaded H-Bridge medium voltage drive, the power cell and the bypass module thereof according to the present application, which is provided by several embodiments with reference to accompanying drawings. It should be understood that the embodiments described hereinafter are only for illustrative purpose, but not for limiting the present application.

As used in the embodiments and scope of the present application, "a", "an" and "the" are intended to include both of the singular and plural forms, unless the context clearly defines otherwise.

As used herein, "around", "about" or "approximately" are intended to indicate any quantity which may vary slightly without changing its substance. If there is not any special statement in the embodiments, a given value indicated by "around", "about" or "approximately" shall generally have an allowable error range within 20%, preferably within 10%, and more preferably within 5%.

The First Embodiment

Figure 1:
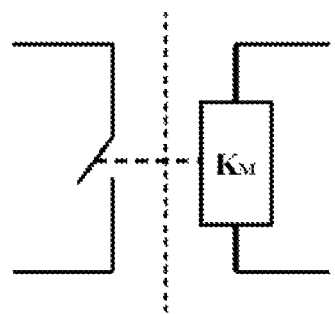
FIG. 1 is a schematic view showing a contact-type bypass circuit in related arts.
Figure 2:
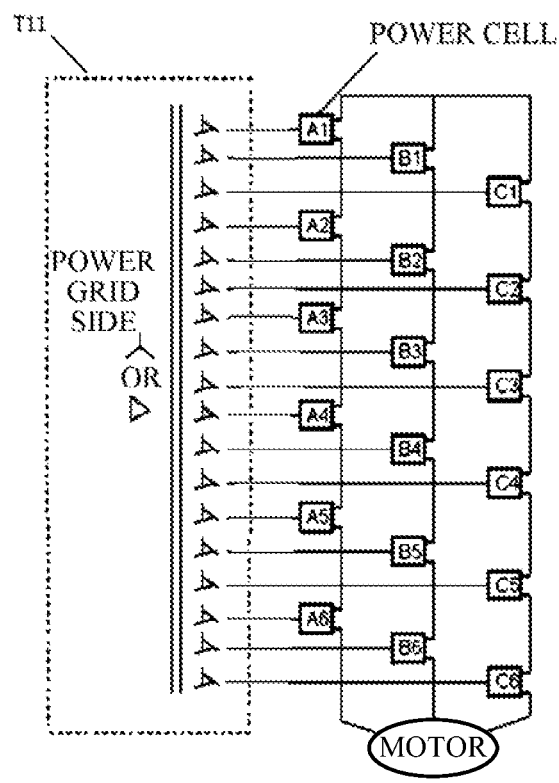
FIG. 2 is a structural schematic view showing a cascaded H-Bridge medium voltage drive of the present application.

As shown in FIG. 2, a cascaded H-Bridge medium voltage drive is provided according to the first embodiment of the present application, comprising a phase shifting transformer T11 and at least one power cell.

As an embodiment shown in FIG. 2, it is a schematic view showing a cascaded H-Bridge medium voltage drive of 6 kV with 18 power cells. The cascaded H-Bridge medium voltage drive comprises the phase shifting transformer T11 and 18 power cells which constitute three phase output of the cascaded H-Bridge medium voltage drive, wherein, each phase comprises 6 power cells connected in series and outputs a high voltage.

Figure 3:
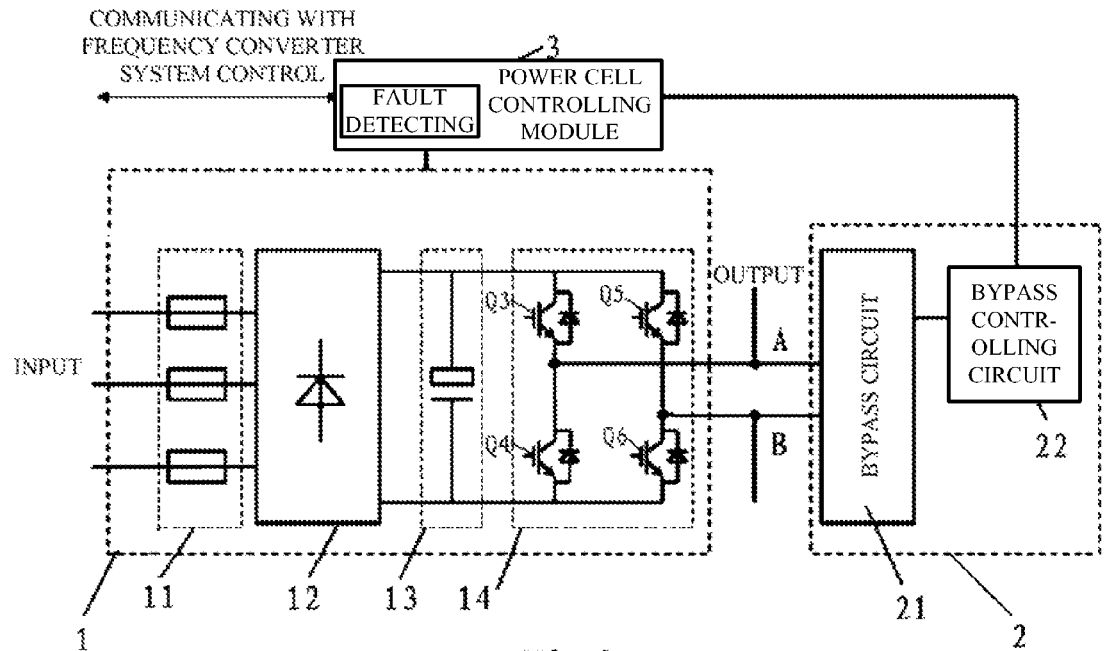
FIG. 3 is a schematic view showing one embodiment of a power cell of the present application.

FIG. 3 is a circuit diagram of a power cell shown in FIG. 2 with a bypass module 2. The power cell comprises a major circuit module 1, a bypass module 2 and a power cell controlling module 3. As an embodiment, the major circuit module 1 includes a fuse 11, a rectifier 12, a bus capacitor 13 and an H-Bridge inverter (inverter bridge arms) 14.

As an embodiment, three-phase (U, V, W) outputs of a secondary winding of the phase shifting transformer are connected with the three-phase input ends of a power cell respectively, and the three-phase alternating current (AC) is rectified into a direct current (DC) by the rectifier 12. The rectifier 12 in this embodiment is a diode rectifier, but it may be other types of rectifiers in other embodiments. A DC voltage output by the rectifier 12 is connected to the bus capacitor 13, and then inverted into an AC voltage by the H-Bridge inverter 14. Each H-Bridge inverter 14 comprises a first output end A and a second output end B, that is, the major circuit module 1 of each power cell has a first output end A and a second output end B.

As shown in FIG. 2, in the cascaded H-bridge medium voltage drive, power cells A1, A2, A3, A4, A5 and A6 are connected in series with each other, then output a first-phase voltage of the cascaded H-Bridge medium voltage drive. That is, the second output end B of the power cell A1 is connected with the first output end A of the power cell A2, the second output end B of the power cell A2 is connected with the first output end A of the power cell A3, the second output end B of the power cell A3 is connected with the first output end A of the power cell A4, the second output end B of the power cell A4 is connected with the first output end A of the power cell A5, and the second output end B of the power cell A5 is connected with the first output end A of the power cell A6, so as to output the first-phase voltage of the cascaded H-Bridge medium voltage drive. Similarly, power cells B1, B2, B3, B4, B5 and B6 are cascaded to output a second-phase voltage of the cascaded H-Bridge medium voltage drive, power cells C1, C2, C3, C4, C5 and C6 are cascaded to output a third-phase voltage of the cascaded H-Bridge medium voltage drive. The three-phase output voltages are supplied to a three-phase load such as a motor.

The phase shifting transformer T11 in the first embodiment of the present application is known in the art, it can be implemented by those skilled in the art according to the technical solution disclosed in the first embodiment, and thus the details thereof are omitted in this embodiment.

As an embodiment, the bypass module 2 in the first embodiment of the present application comprises a bypass circuit 21 and a bypass controlling circuit 22.

As an embodiment, the H-Bridge inverter 14 of the power cell may be constituted by any switch elements of which the on/off state is controlled by its control end. As the present embodiment, the switch elements forming the H-Bridge inverter 14 of the power cell are IGBTs (Insulated Gate Bipolar Transistor). The H-Bridge inverter 14 of the power cell consists of a third IGBT Q3, a fourth IGBT Q4, a fifth IGBT Q5 and a sixth IGBT Q6. The third IGBT Q3 is connected in series with the fourth IGBT Q4 to form an arm of the H-Bridge inverter 14, and the fifth IGBT Q5 is connected in series with the sixth IGBT Q6 to form another arm of the H-Bridge inverter 14. Two ends of one bridge arm are electrically connected with two ends of the other bridge arm respectively, so as to form the H-Bridge inverter 14 of the power cell. A midpoint of one arm of the H-Bridge inverter 14 is used as a first output end, i.e., the output end A, of the H-Bridge inverter 14 (i.e., of the major circuit module 1); and a midpoint of another arm of the H-Bridge inverter 14 is used as a second output end, i.e., the output end B, of the H-Bridge inverter 14 (i.e., of the major circuit module 1). Moreover, two output ends of the major circuit module 1 are connected to two input ends of the bypass circuit 21, respectively.

Figure 4:
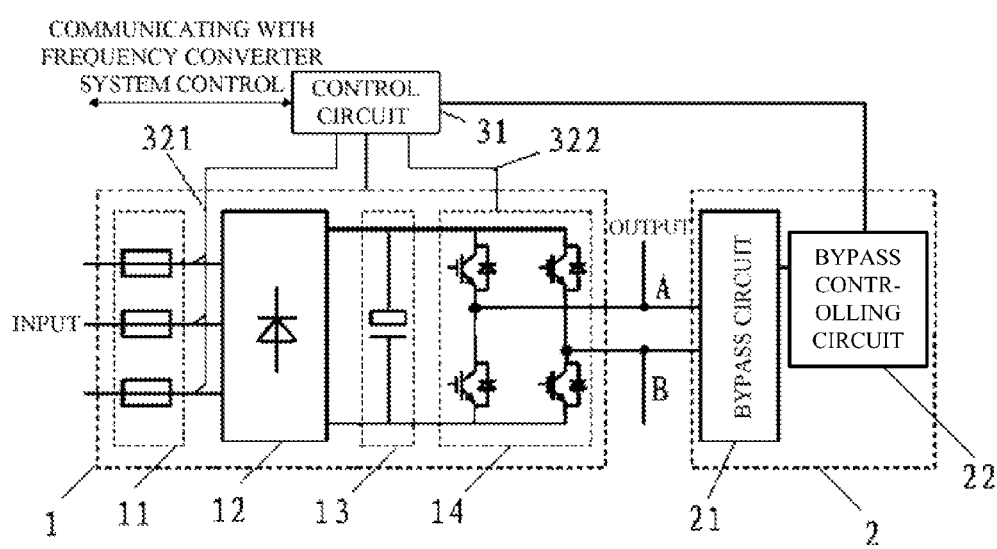
FIG. 4 is a schematic view showing another embodiment of a power cell of the present application.

As an embodiment shown in FIG. 4, the power cell controlling module 3 comprises a control circuit 31 and a fault detecting unit 32. The fault detecting unit 32 includes a phase lack detecting circuit 321 and/or a bridge arm failure detecting circuit 322. In other embodiments, the power cell may also comprise other types of fault detecting circuit.

The bypass module 2 of the present application is in a standby mode when the power cell of the cascaded H-bridge medium voltage drive is in normal operation, and the output ends of inverter bridge arms in the respective phase power cells of the cascaded H-bridge medium voltage drive are connected in series to output respective phase voltage of the cascaded H-bridge medium voltage drive. Once fault occurs in one or more power cells of the cascaded H-bridge medium voltage drive, for example, when a phase lack is detected at an input end of the power cell by the phase lack detecting circuit 321 and/or a failure in an inverter bridge arm of the major circuit module 1 is detected by the bridge arm failure detecting circuit 322, a fault detecting signal is generated by the control circuit 31 and then is transmitted to a drive controlling system (not shown). Then, a control signal is transmitted from the drive controlling system to the power cell controlling module 3, so as to trigger the bypass controlling circuit 22 of the bypass module 2. The bypass controlling circuit 22 switches the bypass circuit 21 on for operation to bypass the major circuit module of corresponding power cell. Alternatively, the control signal is transmitted directly from the drive controlling system (not shown) to the bypass controlling circuit 22, then the bypass controlling circuit 22 switches the bypass circuit 21 on for operation to bypass the major circuit module 1 of corresponding malfunctioned power cell. In this way, the whole cascaded H-bridge medium voltage drive can keep operating even if one or more power cells therein malfunction, whereby the operation reliability of cascaded H-bridge medium voltage drive system is improved greatly.

The Second Embodiment

As an embodiment, a bypass module of power cell in cascaded H-bridge medium voltage drive according to the second embodiment of the present application comprises a bypass circuit 21 and a bypass controlling circuit 22.

The bypass circuit 21 includes a first switch element, a second switch element, a first diode and a second diode.

The bypass circuit 21 has a first input end and a second input end, wherein the first input end is electrically connected with the first output end of the major circuit module 1, and the second input end is electrically connected with the second output end of the major circuit module 1. When the major circuit module 1 malfunctions and the bypass circuit 21 is switched on for operation, one of the first switch element and the second switch element and one of the first diode and the second diode in the bypass circuit 21 turn on to bypass the major circuit module 1 of corresponding power cell.

The first and second switch elements may be any switch elements of which the on/off state is controlled by its controlling end.

Figure 5:
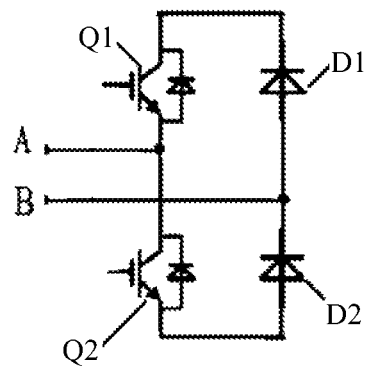
FIG. 5 is a structural schematic view showing one embodiment of a bypass circuit of the present application.

As an embodiment shown in FIG. 5, the bypass circuit 21 comprises a first IGBT Q1, a second IGBT Q2, a first diode D1 and a second diode D2.

The first IGBT Q1 and the second IGBT Q2 are connected in series to form a first bridge arm, wherein an emitter of the first IGBT Q1 is electrically connected with a collector of the second IGBT Q2. The first diode D1 and the second diode D2 are connected in series to form a second bridge arm, wherein an anode of the first diode D1 is electrically connected with a cathode of the second diode D2. Two ends of the first bridge arm are coupled to two ends of the second bridge arm respectively, that is, a collector of the first IGBT Q1 is electrically connected with a cathode of the first diode D1, and an emitter of the second IGBT Q2 is electrically connected with an anode of the second diode D2.

The first and second IGBTs Q1 and Q2 are connected in series with a same direction, and the first and second diodes D1 and D2 are also connected in series with a same direction.

A conducting wire led from a point between the first IGBT Q1 and the second IGBT Q2 is used as the first input end of the bypass circuit 21. A conducting wire led from a point between the first diode D1 and the second diode D2 is used as the second input end of the bypass circuit 21.

Figure 6:
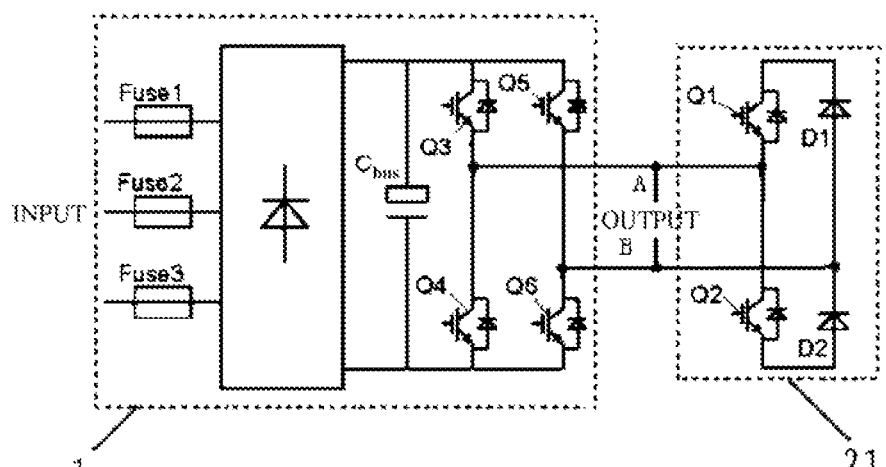
FIG. 6 is a schematic view showing a connection of major circuit module and bypass circuit in one embodiment of present application.

As an embodiment shown in FIG. 6, it is a schematic view showing a connection between the major circuit module 1 and the bypass circuit 21. The first output end A of the major circuit module 1 in the power cell is electrically connected to the first input end of the bypass circuit 21, and the second output end B of the major circuit module 1 in the power cell is electrically connected to the second input end of the bypass circuit 21. Thus, the point A shown in FIG. 3 is also the first input end of the bypass circuit 21, and the point B is also the second input end of the bypass circuit 21.

A branch is formed by the first diode D1 and the first IGBT Q1 of the bypass circuit 21, and another branch is formed by the second diode D2 and the second IGBT Q2. One of the two branches turns on in a negative half cycle or a positive half cycle of the AC output.

Figure 7:
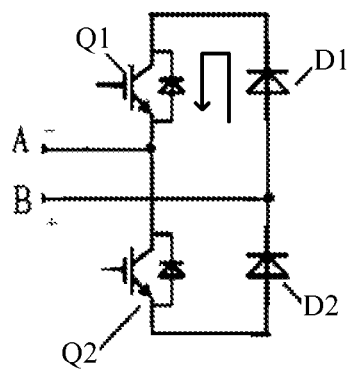
FIG. 7 is a schematic view showing a type of current flow direction in a bypass circuit of the present application.

As shown in FIG. 7, when the current received at the first input end (A) of the bypass circuit 21 is negative, and the current received at the second input end (B) is positive, that is, when the current flows out from the first output end A of inverter bridge arm in the power cell, and the current flows in from the second output end B of inverter bridge arm in the power cell, if the major circuit module 1 malfunctions and the bypass circuit 21 is switched on for operation, the first diode D1 and the first IGBT Q1 of the bypass circuit 21 turn on to bypass corresponding major circuit module 1, so as to enable the whole cascaded H-bridge medium voltage drive to keep operating, with a current direction indicated by an arrow shown in FIG. 7.

Figure 8:
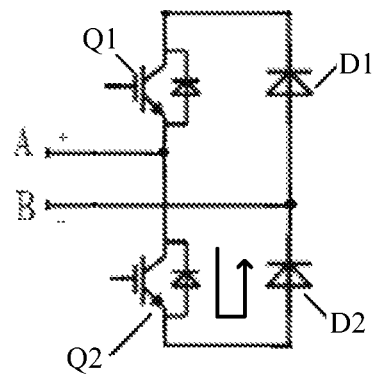
FIG. 8 is a schematic view showing another type of current flow direction in a bypass circuit of the present application.

As shown in FIG. 8, when the current received at the first input end (A) of the bypass circuit 21 is positive, and the current received at the second input end (B) is negative, that is, when the current flows in from the first output end A of inverter bridge arm in the power cell, and the current flows out from the second output end B of inverter bridge arm in the power cell, if the major circuit module 1 malfunctions and the bypass circuit 21 is switched on for operation, the second diode D2 and the second IGBT Q2 of the bypass circuit 21 turn on to bypass corresponding major circuit module 1, so as to enable the whole cascaded H-bridge medium voltage drive to keep operation, with a current direction indicated by an arrow shown in FIG. 8.

Figure 9:
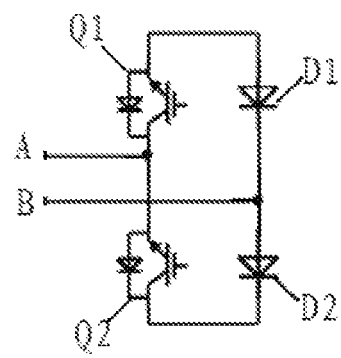
FIG. 9 is a structural schematic view showing another embodiment of a bypass circuit of the present application.

As another embodiment of the bypass circuit 21 shown in FIG. 9, a collector of the first IGBT Q1 is electrically connected with an emitter of the second IGBT Q2 to form the first bridge arm of the bypass circuit 21, a cathode of the first diode D1 is electrically connected with an anode of the second diode D2 to form the second bridge arm of the bypass circuit 21, and two ends of the first bridge arm are electrically connected with two ends of the second bridge arm respectively. A midpoint of the first bridge arm is used as the first input end A of the bypass circuit 21, and a midpoint of the second bridge arm is used as the second input end B of the bypass circuit 21.

When the current received at the first input end (A) of the bypass circuit 21 is positive, and the current received at the second input end (B) is negative, that is, when the current flows in from the first output end A of inverter bridge arm in the power cell, and the current flows out from the second output end B of inverter bridge arm in the power cell, if the major circuit module 1 malfunctions and the bypass circuit 21 is switched on for operation, the first diode D1 and the first IGBT Q1 of the bypass circuit 21 turn on to bypass corresponding major circuit module 1, so as to enable the whole cascaded H-bridge medium voltage drive to keep operating.

When the current received at the first input end (A) of the bypass circuit 21 is negative, and the current received at the second input end (B) is positive, that is, when the current flows out from the first output end A of inverter bridge arm in the power cell, and the current flows in from the second output end B of inverter bridge arm in the power cell, if the major circuit module 1 malfunctions and the bypass circuit 21 is switched on for operation, the second diode D2 and the second IGBT Q2 of the bypass circuit 21 turn on to bypass corresponding major circuit module 1, so as to enable the whole cascaded H-bridge medium voltage drive to keep operating.

Figure 10:
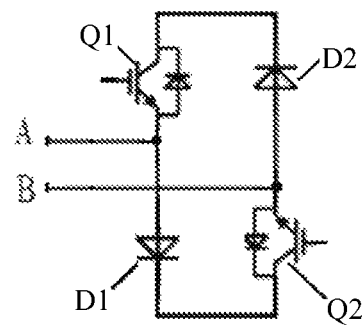
FIG. 10 is a structural schematic view showing still another embodiment of a bypass circuit of the present application.

As still another embodiment of the bypass circuit 21 shown in FIG. 10, an emitter of the first IGBT Q1 is electrically connected with an anode of the first diode D1 to form the first bridge arm of the bypass circuit 21, an emitter of the second IGBT Q2 is electrically connected with an anode of the second diode D2 to form the second bridge arm of the bypass circuit 21, and two ends of the first bridge arm are electrically connected with two ends of the second bridge arm respectively. A midpoint of the first bridge arm is used as the first input end A of the bypass circuit 21, and a midpoint of the second bridge arm is used as the second input end B of the bypass circuit 21.

When the current received at the first input end (A) of the bypass circuit 21 is positive, and the current received at the second input end (B) is negative, that is, when the current flows in from the first output end A of inverter bridge arm in the power cell, and the current flows out from the second output end B of inverter bridge arm in the power cell, if the major circuit module 1 malfunctions and the bypass circuit 21 is switched on for operation, the first diode D1 and the second IGBT Q2 of the bypass circuit 21 turn on to bypass corresponding major circuit module 1, so as to enable the whole cascaded H-bridge medium voltage drive to keep operating.

When the current received at the first input end (A) of the bypass circuit 21 is negative, and the current received at the second input end (B) is positive, that is, when the current flows out from the first output end A of inverter bridge arm in the power cell, and the current flows in from the second output end B of inverter bridge arm in the power cell, if the major circuit module 1 malfunctions and the bypass circuit 21 is switched on for operation, the second diode D2 and the first IGBT Q1 of the bypass circuit 21 turn on to bypass corresponding major circuit module 1, so as to enable the whole cascaded H-bridge medium voltage drive to keep operating.

Figure 11:
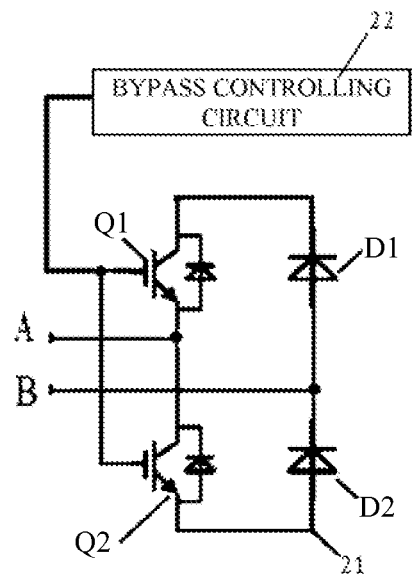
FIG. 11 is a structural schematic view showing one embodiment of a bypass module of the present application.

As shown in FIG. 11, the bypass module of the power cell in the cascaded H-bridge medium voltage drive is further provided with a bypass controlling circuit 22, which is electrically connected to the switch elements of the bypass circuit 21 so as to control on/off state of the switch elements.

The connection relationship between the bypass controlling circuit 22 and the bypass circuit 21 will now be illustrated with the example of bypass circuit 21 shown in FIG. 5. Gates of the first IGBT Q1 and the second IGBT Q2 are connected with the bypass controlling circuit 22, which is used to control on/off state of these two IGBTs and is also connected with the power cell controlling module.

The bypass module 2 of the present application is in a standby state when the power cell of the cascaded H-bridge medium voltage drive is in normal operation, and the output ends of inverter bridge arms in the respective phase power cells of the cascaded H-Bridge medium voltage drive are connected in series to output respective phase voltage of the cascaded H-Bridge medium voltage drive. Once a fault occurs in one or more power cells of the cascaded H-bridge medium voltage drive, a fault signal detected by the failure detecting circuit is transmitted by the controlling circuit to the drive controlling system (not shown), then a control signal is transmitted from the drive controlling system to the power cell controlling module 3, so as to trigger the bypass controlling circuit 22 of the power cell. Then the bypass controlling circuit 22 switches the bypass circuit 21 on for operation to make the major circuit module 1 of the malfunctioned power cell be shorted. Thus, it can be ensured that the bypass of the power cell is switched on for operation when the major circuit module 1 of a certain power cell malfunctions, so as not to interfere with normal operations of other power cells in the whole cascaded H-bridge medium voltage drive, whereby the operation reliability of cascaded H-bridge medium voltage drive system is improved greatly.

The Third Embodiment

As an embodiment, a bypass module 2 provided by the present application comprises a bypass circuit 21 and a bypass controlling circuit 22. The bypass circuit 21 includes a first IGBT Q1, a second IGBT Q2, a first diode D1, a second diode D2 and an absorption circuit 211.

Figure 12:
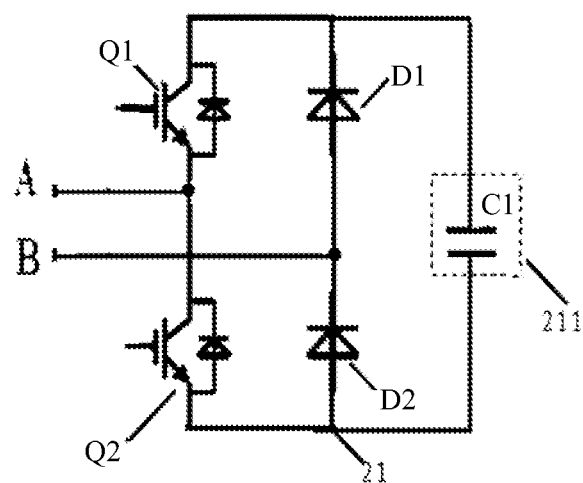
FIG. 12 is a structural schematic view showing a bypass circuit with an absorption capacitor of the present application.

As an embodiment, the absorption circuit 211 is an absorption capacitor C1. As shown in FIG. 12, taking the bypass circuit 21 shown in FIG. 5 as an example, the absorption capacitor C1 is connected in parallel across the bypass circuit 21, that is, across the bridge arm formed by the first diode D1 and the second diode D2 being connected in series.

Figure 13:
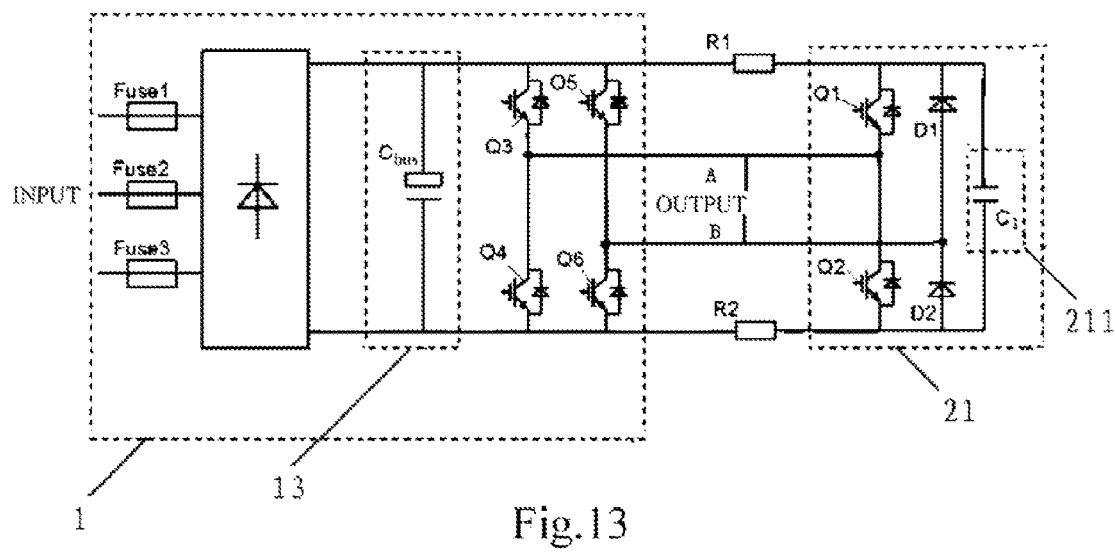
FIG. 13 is a schematic view showing a connection of major circuit module and bypass circuit in another embodiment of the present application.

Referring to FIG. 13, which is a schematic view showing an embodiment of connection between the bypass circuit 21 shown in FIG. 12 and the major circuit module 1, two output ends of the major circuit module 1 are electrically connected with two input ends of the bypass circuit 21, respectively.

As an embodiment, the power cell also comprises a first protection resistor R1 and a second protection resistor R2, wherein one end of the first protection resistor R1 is connected with one end of the absorption capacitor C1, another end of the first protection resistor R1 is connected with one end of the bus capacitor 13 of the major circuit module 1; one end of the second protection resistor R2 is connected with another end of the absorption capacitor C1, and another end of the second protection resistor R2 is connected with another end of the bus capacitor 13 of the major circuit module 1.

When the bus capacitor 13 in major circuit module 1 has large leakage inductance and/or the IGBTs of H-Bridge inverter 14 in major circuit module 1 turn off quickly due to a malfunction occurred in the major circuit module 1, if the output of the major circuit module 1 is shorted, then when the H-Bridge inverter 14 of the major circuit module 1 turns off for protection, there may be a very high voltage peak generated between the output ends A and B of the major circuit module 1, and/or being accompanied with a high frequency voltage oscillation having a great oscillation peak value. This voltage peak may approach or even exceed the voltage SOA (safe operating area) of electronic devices in the bypass circuit 21, such as IGBTs.

Therefore, as an embodiment, in order to prevent the devices such as IGBTs from being damaged, the bypass circuit 21 is provided with the absorption capacitor C1, as well as the first and second protection resistors R1 and R2. The absorption capacitor C1 is charged by the major circuit module 1 via the first and second protection resistors R1 and R2 when the power cell is in normal operation, so as to prevent the power cell from operating abnormally due to the absorption capacitor C1 being charged by a full bridge rectifier structure formed by the bypass circuit 21 while the power cell operating normally, thus the operation reliability of system is improved. Since the IGBTs Q1 and Q2 and the diodes D1 and D2 have low leakage currents, there is a small loss on the first and second protection resistors R1 and R2.

Figure 14:
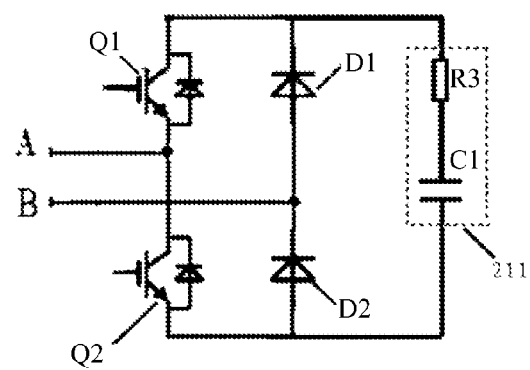
FIG. 14 is a structural schematic view showing a bypass circuit with an absorption capacitor and a third resistor of the present application.

As an embodiment shown in FIG. 14, the absorption circuit 211 further comprises a third resistor R3. After the absorption capacitor C1 is connected in series with the third resistor R3, they are connected in parallel across the bypass circuit 21, that is, across the bridge arm formed by the first diode D1 and the second diode D2 being connected in series.

Figure 15:
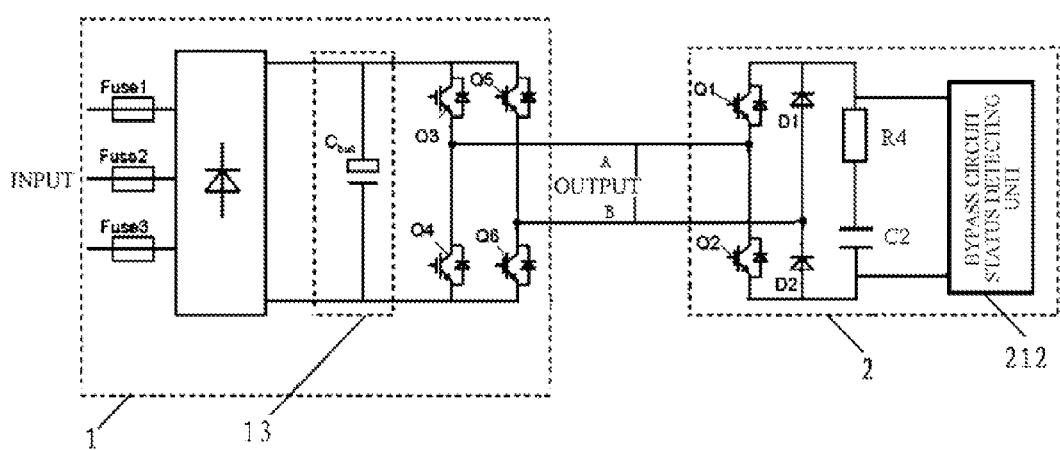
FIG. 15 is a schematic view showing a connection of major circuit module and bypass circuit in still another embodiment of the present application.

As an embodiment shown in FIG. 15, the bypass circuit 21 further comprises a RC branch connected in series and a bypass circuit status detecting unit 212. The RC branch is formed by a fourth resistor R4 and a storage capacitor C2 being connected in series, and is connected in parallel across the bridge arm of the bypass circuit 21. The bypass circuit status detecting unit 212 is used to detect whether the bypass circuit 21 is switched on for operation.

When the power cell is in normal operation, a pulsed voltage is output from the output ends (A, B), and charges the storage capacitor C2 of the RC branch via a rectifying circuit, which is formed by an anti-parallel diode inherently existing in the first IGBT Q1 or the second IGBT Q2 of the bypass circuit 21 and the second diode D2 or the first diode D1 of the bypass circuit 21. Here, the fourth resistor R4 may be selected as having a high resistance value, such as several tens of kilo-ohms (kΩ), and the storage capacitor C2 may always be maintained at a high voltage.

When the major circuit module 1 of the power cell malfunctions, the bypass circuit 21 is switched on for operation, that is, the IGBTs Q1 and Q2 turn on simultaneously, thus the capacitor C2 of the RC branch may be discharged to a voltage of 0V rapidly. Therefore, the operation status of the bypass circuit 21 may be determined by detecting the voltage across the capacitor C2 of the RC branch. When the voltage across the capacitor C2 is at a high level, the power cell is considered as being in normal operation, that is, the bypass circuit 21 is not switched on for operation. When the voltage across the capacitor C2 is at a low level, the major circuit module 1 of the power cell is considered as malfunctioned, that is, the bypass circuit 21 is switched on for operation.

As an embodiment, if the cascaded H-Bridge medium voltage drive is expected to have a high power level, the first and second switch elements of the bypass circuit 21 in the second and third embodiments of the present application may respectively be formed by several switch elements connected in parallel. For example, when the first and second IGBTs are used as the first and second switch elements respectively, these IGBTs may respectively be formed by several IGBTs connected in parallel.

In the bypass circuit 21 of the power cell in the cascaded H-bridge medium voltage drive according to the embodiments of the present application, there is only one branch being in operation when the bypass circuit 21 is switched on for operation, that is, there are only two power devices (a diode and a switch element) on one branch being turned on at any operating time, so the number of devices which are turned on is small and the loss is low. Furthermore, the bypass circuit 21 provided by the present application is simple in structure and has high reliability. Moreover, reliability of the bypass circuit 21 can be further improved by the absorption capacitor C1 and the protection resistors (R1, R2), thus reliability of the cascaded H-bridge medium voltage drive can be improved. In addition, operation status of the bypass circuit 21 can be detected accurately by a RC branch and a bypass circuit status detecting unit 212.

It is obvious that variations and modifications may be made to the invention by those skilled in the art based on the disclosure without departing from the spirit and scope of the present invention. Thus, the present application intends to cover all of variations and modifications provided that they fall within the scope of the appended claims and equivalents thereto.

What is claimed is:

1. A bypass module of a power cell in a cascaded H-Bridge medium voltage drive, configured for bypassing a major circuit module of the power cell, wherein the major circuit module comprises a fuse, a rectifier, a bus capacitor and an H-Bridge inverter, two points led from the H-Bridge inverter respectively being configured as a first output end and a second output end of the major circuit module, the bypass module comprising a bypass circuit, wherein, the bypass circuit comprises a first bridge arm and a second bridge arm, the first bridge arm has at least one of a first switch element and a second switch element, the second bridge arm has at least one of a first diode and a second diode;

a point led from the first bridge arm of the bypass circuit is configured as a first input end of the bypass circuit, a point led from the second bridge arm of the bypass circuit is configured as a second input end of the bypass circuit, the first input end is electrically connected with the first output end of the major circuit module, and the second input end is electrically connected with the second output end of the major circuit module; and when the major circuit module malfunctions and the bypass circuit is switched on for operation, one of the first switch element and the second switch element and one of the first diode and the second diode of the bypass circuit turn on to bypass the major circuit module of corresponding power cell.

2. The bypass module according to claim 1, wherein, the first switch element is a first IGBT, and the second switch element is a second IGBT.

3. The bypass module according to claim 2, wherein, the bypass circuit comprises the first IGBT, the second IGBT, the first diode and the second diode;

an emitter of the first IGBT is electrically connected with a collector of the second IGBT, an anode of the first diode is electrically connected with a cathode of the second diode, a collector of the first IGBT is electrically connected with a cathode of the first diode, and an emitter of the second IGBT is electrically connected with an anode of the second diode;

a conducting wire led from a point between the first IGBT and the second IGBT is configured as the first input end of the bypass circuit;

a conducting wire led from a point between the first diode and the second diode is configured as the second input end of the bypass circuit;

a first branch is formed by the first diode and the first IGBT, and a second branch is formed by the second diode and the second IGBT; and the first output end of the major circuit module is electrically connected to the first input end of the bypass circuit, and the second output end of the major circuit module is electrically connected to the second input end of the bypass circuit.

4. The bypass module according to claim 3, wherein, when a current received at the first input end of the bypass circuit is negative, and a current received at the second input end thereof is positive, if the major circuit module of the power cell malfunctions and the bypass circuit is switched on for operation, the first diode and the first IGBT of the bypass circuit turn on to bypass the major circuit module of corresponding power cell, so as to enable the whole cascaded H-Bridge medium voltage drive to keep operating.

5. The bypass module according to claim 3, wherein, when a current received at the first input end of the bypass circuit is positive, and a current received at the second input end thereof is negative, if the major circuit module of the power cell malfunctions and the bypass circuit is switched on for operation, the second diode and the second IGBT of the bypass circuit turn on to bypass the major circuit module of corresponding power cell, so as to enable the whole cascaded H-Bridge medium voltage drive to keep operating.

6. The bypass module according to claim 2, wherein, the bypass circuit comprises the first IGBT, the second IGBT, the first diode and the second diode;

a collector of the first IGBT is electrically connected with an emitter of the second IGBT, a cathode of the first diode is electrically connected with an anode of the second diode, an emitter of the first IGBT is electrically connected with an anode of the first diode, and a collector of the second IGBT is electrically connected with a cathode of the second diode;

a conducting wire led from a point between the first IGBT and the second IGBT is configured as the first input end of the bypass circuit;

a conducting wire led from a point between the first diode and the second diode is configured as the second input end of the bypass circuit;

a first branch is formed by the first diode and the first IGBT, and a second branch is formed by the second diode and the second IGBT; and the first output end of the major circuit module is electrically connected to the first input end of the bypass circuit, and the second output end of the major circuit module is electrically connected to the second input end of the bypass circuit.

7. The bypass module according to claim 6, wherein, when a current received at the first input end of the bypass circuit is positive, and a current received at the second input end thereof is negative, if the major circuit module of the power cell malfunctions and the bypass circuit is switched on for operation, the first diode and the first IGBT of the bypass circuit turn on to bypass the major circuit module of corresponding power cell, so as to enable the whole cascaded H-Bridge medium voltage drive to keep operating.

8. The bypass module according to claim 6, wherein, when a current received at the first input end of the bypass circuit is negative, and a current received at the second input end thereof is positive, if the major circuit module of the power cell malfunctions and the bypass circuit is switched on for operation, the second diode and the second IGBT of the bypass circuit turn on to bypass the major circuit module of corresponding power cell, so as to enable the whole cascaded H-Bridge medium voltage drive to keep operating.

9. The bypass module according to claim 2, wherein, the bypass circuit comprises the first IGBT, the second IGBT, the first diode and the second diode;

an emitter of the first IGBT is electrically connected with an anode of the first diode, an emitter of the second IGBT is electrically connected with an anode of the second diode, a collector of the first IGBT is electrically connected with a cathode of the second diode, and a collector of the second IGBT is electrically connected with a cathode of the first diode;

a conducting wire led from a point between the first IGBT and the first diode is configured as the first input end of the bypass circuit;

a conducting wire led from a point between the second IGBT and the second diode is configured as the second input end of the bypass circuit;

a first branch is formed by the first diode and the second IGBT, and a second branch is formed by the second diode and the first IGBT; and the first output end of the major circuit module is electrically connected to the first input end of the bypass circuit, and the second output end of the major circuit module is electrically connected to the second input end of the bypass circuit.

10. The bypass module according to claim 9, wherein, when a current received at the first input end of the bypass circuit is positive, and a current received at the second input end thereof is negative, if the major circuit module of the power cell malfunctions and the bypass circuit is switched on for operation, the first diode and the first IGBT of the bypass circuit turn on to bypass the major circuit module of corresponding power cell, so as to enable the whole cascaded H-Bridge medium voltage drive to keep operating.

11. The bypass module according to claim 9, wherein, when a current received at the first input end of the bypass circuit is negative, and a current received at the second input end thereof is positive, if the major circuit module of the power cell malfunctions and the bypass circuit is switched on for operation, the second diode and the first IGBT of the bypass circuit turn on to bypass the major circuit module of corresponding power cell, so as to enable the whole cascaded H-Bridge medium voltage drive to keep operating.

12. The bypass module according to claim 1, wherein, the bypass circuit further comprises an absorption circuit, which includes an absorption capacitor connected in parallel across the bypass circuit.

13. The bypass module according to claim 12, wherein, the absorption circuit further includes a third protection resistor; the absorption capacitor is connected in series with the third protection resistor, and then they are connected in parallel across the bypass circuit.

14. The bypass module according to claim 12, further comprising a first protection resistor and a second protection resistor, wherein, one end of the first protection resistor is electrically connected with one end of the absorption capacitor, another end of the first protection resistor is electrically connected with one end of the bus capacitor; one end of the second protection resistor is electrically connected with another end of the absorption capacitor, and another end of the second protection resistor is electrically connected with another end of the bus capacitor.

15. The bypass module according to claim 1, wherein, the bypass circuit further comprises a RC branch and a bypass circuit status detecting unit;

the RC branch consists of a fourth resistor and a storage capacitor, the fourth resistor is connected in series with the storage capacitor, and then they are connected in parallel across the bypass circuit;

the bypass circuit status detecting unit is connected in parallel with the RC branch and is configured for detecting whether the bypass circuit is on operation.

16. The bypass module according to claim 1, further comprising a bypass controlling circuit, which is electrically connected with the first switch element and the second switch element and is configured for controlling on or off state of the first switch element and the second switch element.

17. The bypass module according to claim 16, wherein, the first switch element is a first IGBT, and the second switch element is a second IGBT, and gates of the first IGBT and the second IGBT are connected with the bypass controlling circuit.

18. A power cell of a cascaded H-Bridge medium voltage drive, comprising a major circuit module, a power cell controlling module and a bypass module, wherein, the major circuit module comprises a fuse, a rectifier, a bus capacitor, and an H-Bridge inverter, two points led from the H-Bridge inverter being configured as two output ends of the major circuit module;

the bypass module is a bypass module according to claim 1;

two input ends of the bypass module are coupled to two output ends of the major circuit module, respectively; and the power cell controlling module is electrically connected with the major circuit module and the bypass module.

19. The power cell according to claim 18, wherein, the power cell controlling module comprises a control circuit and a fault detecting unit;

the fault detecting unit is configured for detecting whether the major circuit module malfunctions;

the control circuit is configured for transmitting a fault detecting signal when a malfunction is detected by the fault detecting unit.

20. The power cell according to claim 19, wherein, the fault detecting unit includes a phase lack detecting circuit and/or a bridge arm failure detecting circuit;

the phase lack detecting circuit is electrically connected with three-phase inputs of an AC power supply via the fuse, and is configured for detecting whether the major circuit module malfunctions at an AC input end thereof;

the bridge arm failure detecting circuit is electrically connected with the H-Bridge inverter, and is configured for detecting whether the H-Bridge inverter malfunctions.

21. A cascaded H-Bridge medium voltage drive, comprising a phase shifting transformer, a power cell and a three-phase load, wherein, the power cell comprises a major circuit module, a bypass module and a power cell controlling module;

the major circuit module comprises a fuse, a rectifier, a bus capacitor, and an H-Bridge inverter, two points led from the H-Bridge inverter being configured as two output ends of the major circuit module;

the bypass module is a bypass module according to claim 1;

two input ends of the bypass module are coupled to two output ends of the major circuit module, respectively; and the power cell controlling module is electrically connected with the major circuit module and the bypass module.

22. The cascaded H-Bridge medium voltage drive according to claim 21, wherein, the phase shifting transformer comprises at least one secondary winding.

23. The cascaded H-Bridge medium voltage drive according to claim 22, wherein, three-phase outputs of each secondary winding in the phase shifting transformer are connected with three-phase input ends of the power cell, respectively.

24. The cascaded H-Bridge medium voltage drive according to claim 21, wherein, the power cell controlling module comprises a control circuit and a fault detecting unit;

the fault detecting unit is configured for detecting whether the major circuit module malfunctions;

the control circuit is configured for transmitting a fault detecting signal when a malfunction is detected by the fault detecting unit.

25. The cascaded H-Bridge medium voltage drive according to claim 24, wherein, the fault detecting unit includes a phase lack detecting circuit and/or a bridge arm failure detecting circuit;

the phase lack detecting circuit is electrically connected with three-phase inputs of an AC power supply via the fuse, and is configured for detecting whether the major circuit module malfunctions at an AC input end thereof;

the bridge arm failure detecting circuit is electrically connected with the H-Bridge inverter, and is configured for detecting whether the H-Bridge inverter malfunctions.

26. The cascaded H-Bridge medium voltage drive according to claim 24, wherein, the bypass module further comprises a bypass controlling circuit, which is electrically connected with the first switch element and the second switch element and is configured for controlling on or off state of the first switch element and the second switch element.

27. The cascaded H-Bridge medium voltage drive according to claim 26, further comprising a drive controlling system, wherein, when the fault detecting unit detects that the major circuit module of power cell malfunctions, the control circuit generates the fault detecting signal and transmits it to the drive controlling system, then the drive controlling system transmits a control signal to the power cell controlling module, so as to trigger the bypass controlling circuit of the bypass module, whereby the bypass controlling circuit switches the bypass circuit on for operation to bypass the malfunctioned major circuit module.

28. The cascaded H-Bridge medium voltage drive according to claim 26, further comprising a drive controlling system, wherein, when the fault detecting unit detects that the major circuit module of power cell malfunctions, the control circuit generates the fault detecting signal and transmits it to the drive controlling system, then the drive controlling system transmits a control signal to trigger the bypass controlling circuit of the bypass module, whereby the bypass controlling circuit switches the bypass circuit on for operation to bypass the malfunctioned major circuit module.

* * * * *